United States Patent [19]

Ohno et al.

[11] Patent Number: 5,233,599
[45] Date of Patent: Aug. 3, 1993

[54] OPTICAL DISK WITH A RECORDING LAYER COMPOSED OF TELLURIUM, ANTIMONY, AND GERMANIUM

[75] Inventors: Eiji Ohno, Hirakata; Kenichi Nishiuchi, Moriguchi; Noboru Yamada, Hirakata; Nobuo Akahira, Yawata, all of Japan

[73] Assignee: Matsushita Electric Industrial Co., Ltd., Osaka, Japan

[21] Appl. No.: 765,512

[22] Filed: Sep. 25, 1991

Related U.S. Application Data

[62] Division of Ser. No. 657,822, Feb. 20, 1991, Pat. No. 5,130,971.

[30] Foreign Application Priority Data

Mar. 14, 1990 [JP] Japan ................................ 2-63165

[51] Int. Cl.⁵ .......................... G11B 7/24; G11C 13/00
[52] U.S. Cl. ........................... 369/288; 369/100; 365/113
[58] Field of Search ................ 369/288, 100; 365/113

[56] References Cited

U.S. PATENT DOCUMENTS

| | | | |
|---|---|---|---|
| 3,801,966 | 4/1974 | Terao | 365/115 |
| 4,656,079 | 4/1987 | Yamada et al. | 369/275.1 |
| 4,670,345 | 6/1987 | Morimoto et al. | 428/411.1 |
| 4,980,879 | 12/1990 | Yamada et al. | 369/100 |
| 5,098,761 | 3/1992 | Watanabe et al. | 369/288 |
| 5,128,099 | 7/1992 | Strand et al. | 365/113 |

*Primary Examiner*—Eugene R. LaRoche
*Assistant Examiner*—Michael C. Kessell
*Attorney, Agent, or Firm*—Wenderoth, Lind & Ponack

[57] ABSTRACT

A rewritable phase change optical disk in which a first dielectric film, a recording film, a second dielectric film and a reflecting film are stacked on a substrate in this order; the recording film having composition defined by a formula $Ge_xSb_yTe_z$ wherein x, y and z are atomic percentages ranging from 7 to 17, 34 to 44 and 44 to 54, respectively, the x, y and z totalling 100; the recording film having a thickness of 10 to 35 nm; the second dielectric film having a thickness of 5 to 40 nm; the reflecting film being made of one or an alloy of at least Au, Al, Ti, Cr and Ni and having a thickness of 35 nm or more.

7 Claims, 14 Drawing Sheets

Laser beam

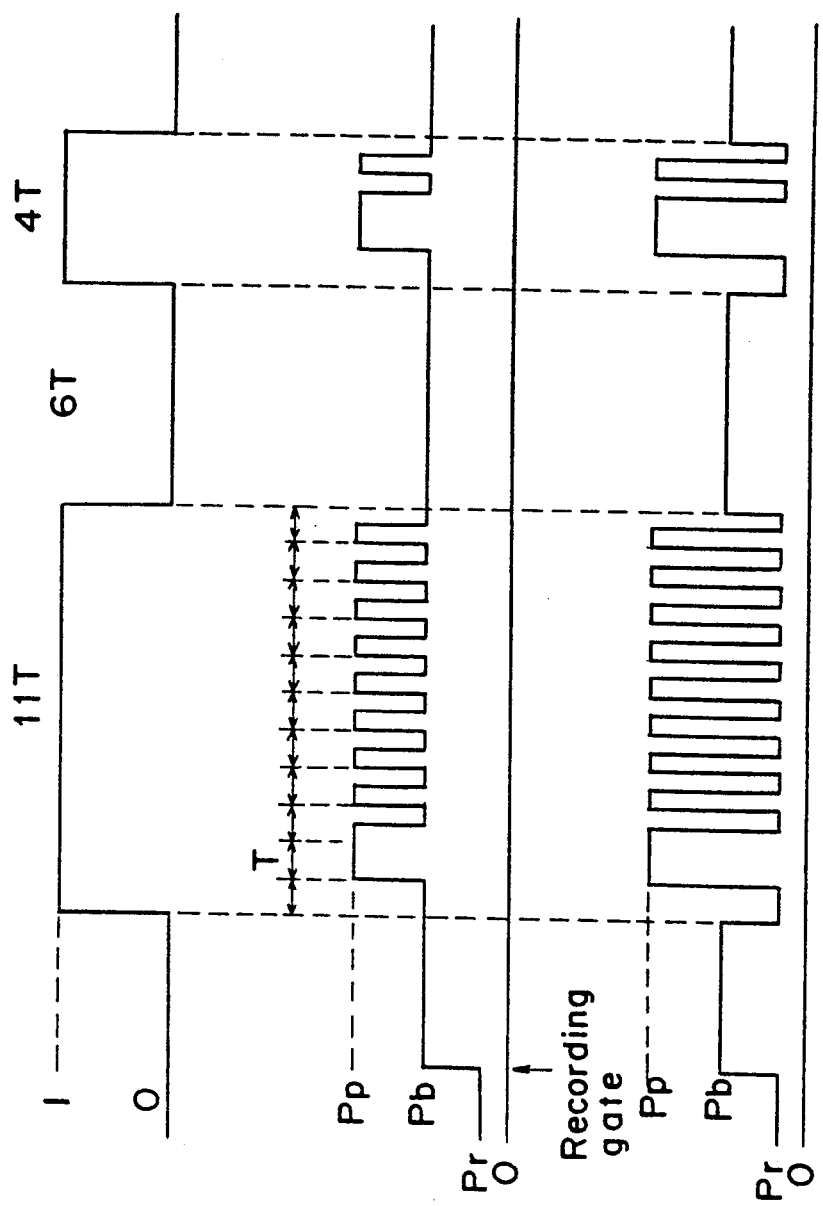

Laser beam

OPTICAL DISK WITH A RECORDING LAYER COMPOSED OF TELLURIUM, ANTIMONY, AND GERMANIUM

This application is divisional of application Ser. No. 07/657,822, filed Feb. 20, 1991, now U.S. Pat. No. 5,130,971.

BACKGROUND OF THE INVENTION

The present invention relates to an optical disk for recording and reproducing optical information at high density by using laser beams, etc. and a method of recording the optical information on the optical disk.

A technology that highly dense information is reproduced or recorded by using laser beams is known and is mainly put to practical use as an optical disk. A compact disk (CD) on which musical signals are preliminarily recorded is commercially available as one example of application of the optical disk. This compact disk is exclusively used for reproduction of the musical signals. Thus, users of the compact disk can reproduce the musical signals but cannot record signals on the compact disk or erase the signals from the compact disk. Thus, recently, research and development have been vigorously conducted on a rewritable optical disk so as to obtain a compact disk enabling recording and erasure of the signals.

The rewritable compact disk can be roughly classified into a magnetooptical disk and a phase change disk. In the phase change disk, a recording film is reversibly converted between amorphous state and crystalline state by changing irradiation conditions of laser beams so as to record signals and reproduction is performed by optically detecting difference in reflectance between amorphous state and crystalline state of the recording film. Thus, as compared with the magnetooptical disk, the phase change disk has such great advantages that signals can be reproduced by change of reflectance of laser beams in the same manner as the compact disk and single beam overwriting can be easily achieved through modulation of laser power.

As one example of the phase change type rewritable compact disk, an optical disk is proposed in Bulletin of Symposium on Optical Memory (1988), p.41-42. This prior art optical disk has a structure in which a recording film 16 is interposed between dielectric films 15 and 17 as shown in FIG. 18 and the recording film 16 is made of GeSbTe alloy falling in the hatched composition range of FIG. 17.

When CD signals have been actually recorded on the above mentioned prior art optical disk by a conventional single beam overwriting procedure, distortion of the reproduced wave form is impracticably large. This is because shape of the recording mark is not symmetric with respect to its front and rear ends, namely the recording mark is distorted into a teardrop-shape such that the arcuate front and rear ends of the recording mark are thin and thick, respectively. More specifically, in the case where recording is performed by laser beams having a modulated wave form shown in FIG. 19a, temperature of the recording film is low at the front end of the recording mark and becomes higher towards the rear end of the recording mark due to heat accumulation phenomenon as shown in FIG. 19b. As a result, the recording mark has a teardrop-shape as shown in FIG. 19c. The heat accumulation phenomenon becomes more conspicuous as relative speed between laser spots and the optical disk, i.e. linear speed is reduced further. When linear speed is quite low, for example, 1.2 to 1.4 m/sec. as in the case of the compact disk, distortion of shape of the recording mark also becomes large. This distortion of shape of the recording mark leads to distortion of the reproduced wave form, thereby resulting in increase of jitter. Since especially, an EFM (eight to fourteen modulation) signal acting as CD standard is a pulse width modulation (PWM) signal and length and width of the recording mark of the EFM signal indicate information, distortion of the recording mark forms a leading cause of errors.

In order to solve the above described problem, the present inventors previously proposed in U.S. patent application Ser. No. 546,906 filed on July 2, 1990, a method and an apparatus in which a recording pulse for forming one recording mark is initially converted into a pulse train composed of a plurality of short pulses and then, is recorded. Through subsequent extensive study, the present inventors have found that distortion of the recording mark is reduced further by specifying structure of an optical disk and composition of a recording film of the optical disk and by specifying a recording method and thus, reproduced signals having quality equivalent to that of a compact disk exclusively used for reproduction can be obtained also in the rewritable optical disk.

SUMMARY OF THE INVENTION

Accordingly, an essential object of the present invention is to provide an optical disk and an optical information recording method in which distortion of a recording mark is minimized and reproduced signals having quality equivalent to that of a compact disk exclusively used for reproduction can be obtained.

In order to accomplish this object of the present invention, an optical disk according to the present invention includes a first dielectric film, a recording film, a second dielectric film and a reflecting film stacked on a substrate in this order; the recording film having composition defined by a formula $Ge_xSb_yTe_z$ wherein x, y and z are atomic percentages ranging from 7 to 17, 34 to 44 and 44 to 54, respectively, the x, y and z totalling 100; the recording film having a thickness of 10 to 35 nm; the second dielectric film having a thickness of 5 to 40 nm; the reflecting film being made of one or an alloy of at least Au, Al, Ti, Cr and Ni and having a thickness of 35 nm or more.

Furthermore, in the case where a digital signal subjected to pulse width modulation is overwritten on this optical disk by using one laser spot, an optical information recording method according to the present invention comprises the steps of: rotating the optical disk at a fixed speed of 1.2 to 1.4 m/sec. relative to the laser spot; converting each of a plurality of pulses contained in the digital signal, into a pulse train composed of a plurality of pulses; and modulating a laser power between an erasing level and a recording level by the pulse train and forming a recording mark on the optical disk by the pulse train so as to record the digital signal on the optical disk; the pulse train being composed of a leading pulse and a subsequent pulse train; the pulses of the subsequent pulse train having an identical width and being arranged at an identical interval; the leading pulse having, at all times, a fixed width larger than the width of each of the pulses of the subsequent pulse train; wherein when the recording mark has an n-th length (n=natural number), the number of the pulses in the subsequent pulse train is (n-1).

Before the signal is recorded on the optical disk by modulating the laser power, the optical information recording method may comprise the step of irradiating a laser beam onto the optical disk continuously by maintaining a laser power at not less than a level for fusing the recording film so as to erase an old signal.

Both the optical disk and the optical information recording method, according to the present invention have a striking effect on reduction of heat accumulation referred to above.

In the optical disk of the present invention, since the recording film having a small thickness is provided quite close to the metallic recording film, heat diffusion effect is great. Thus, the recording film is rapidly cooled after having been heated. Therefore, heat accumulation is lessened and thus, such a phenomenon can be restricted that the rear end portion of the recording mark is heated excessively.

Furthermore, composition of the recording film defined in the present invention can achieve high erasure speed, excellent recording sensitivity and remarkable thermal stability in the above structure of the optical disk.

Meanwhile, in the optical information recording method of the present invention, the recording film is initially heated sufficiently by irradiating thereto the leading pulse having a large pulse width and then, is irradiated intermittently by the pulses of the subsequent pulse train having a small pulse width. Hence, heat accumulation at the rear end portion of the recording mark can be reduced. Since the recording signal is modulated between the erasing power and the recording power, the recording mark of the old signal is erased simultaneously with recording of the new signal. However, prior to passage of the recording beam, if the laser beam is continuously irradiated onto the optical disk by maintaining the laser power at not less than the level for fusing the recording film, the old signal is substantially completely erased.

The optical disk and the optical information recording method, according to the present invention produce a fine effect on reduction of distortion of shape of the recording mark even if employed independently. However, when the optical disk and the optical information recording method, according to the present invention are employed simultaneously, the effect is enhanced further and thus, it becomes possible to obtain the reproduced signals having quality equivalent to that of the compact disk even at a low linear speed of, for example, 1.2–1.4 m/sec.

BRIEF DESCRIPTION OF THE DRAWINGS

This object and features of the present invention will become apparent from the following description taken in conjunction with the preferred embodiment thereof with reference to the accompanying drawings, in which:

FIGS. 3, 4a to 4c and FIGS. 5a and 5b are views showing structures of a pulse train in an optical information recording method according to the present invention;

Before the description of the present invention proceeds, it is to be noted that like parts are designated by like reference numerals throughout several views of the accompanying drawings

DESCRIPTION OF THE INVENTION

Hereinbelow, the present invention is described with reference to the accompanying drawings. As described earlier, in order to perform PWM recording at low linear speed, it is necessary to reduce distortion of shape of a recording mark by restricting heat accumulation at the time of recording. In order to reduce distortion of shape of the recording mark, the present inventors have investigated structure of an optical disk and composition of a recording film of the optical disk and a recording method. As a result, the present inventors have found out an optimum optical disk and a recording method which are capable of reducing distortion of shape of the recording mark at a linear speed of 1.2 to 1.4 m/sec. Simultaneous employment of this optical disk and this recording method reduces distortion of shape of the recording mark drastically and has proved quite effective for recording and reproducing an EFM (8-14 modulation) signal acting as CD standard.

Figure 1:
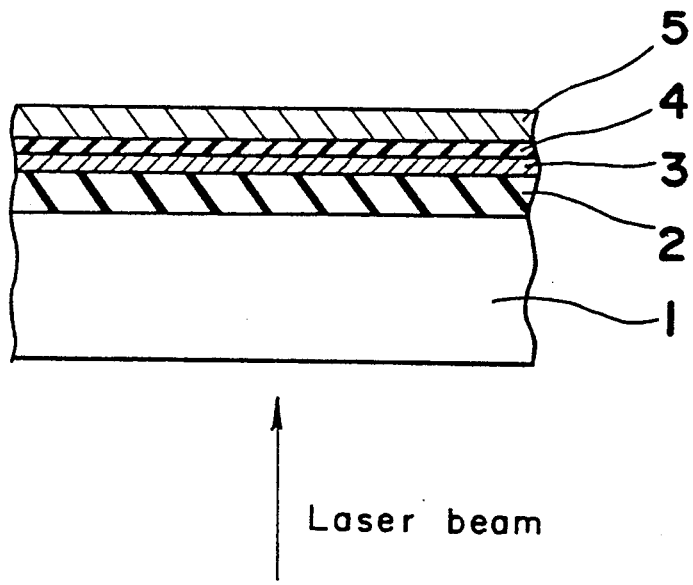
FIG. 1 is a sectional view of an optical disk according to the present invention.

Initially, the optical disk of the present invention is described. FIG. 1 shows structure of the optical disk of the present invention. In FIG. 1, a dielectric film 2, a recording film 3, a dielectric film 4 and a reflecting film 5 are stacked on a substrate 1 in this order. The substrate 1 may be made of metal, glass, resin, etc. However, since a laser beam is generally incident upon the optical disk from the substrate 1, the substrate 1 is made of transparent glass, quartz, polycarbonate, polymethyl methacrylate, etc. The optical disk of the present invention has the following features (1) to (3).

Figure 2:
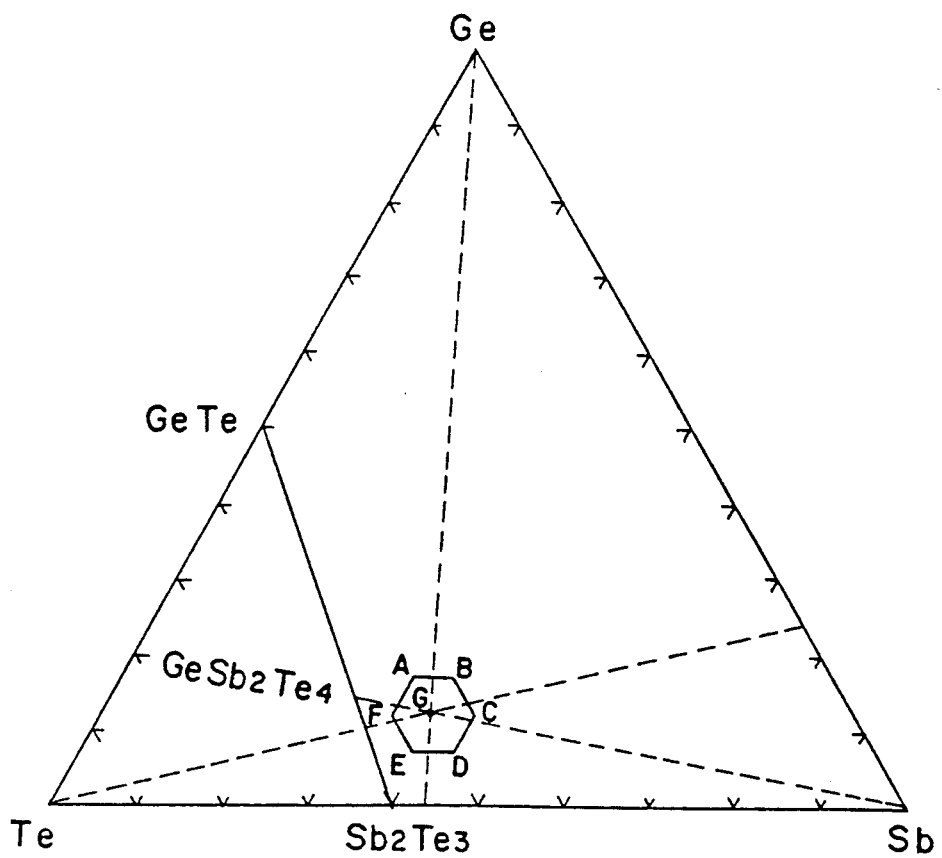
FIG. 2 is a composition diagram showing a range of composition of a recording film of the optical disk of FIG. 1.

(1) Composition of the recording film 3 is so defined as to fall in a region enclosed by points A, B, C, D, E and F in FIG. 2 and the recording film 3 has a thickness of 10–35 nm. FIG. 2 is a composition diagram of equilateral triangle having compositions Ge, Sb and Te of the recording film 3 set at its vertexes, respectively.

(2) The dielectric film 4 has a thickness of 5–40 nm.

(3) The reflecting film 5 is made of one or an alloy of at least Au, Al, Ti, Ni and Cr and has a thickness of 35 nm or more.

Coordinates (Ge, Sb, Te) of the points A to F, expressed in atomic % in FIG. 2 are as follows:

A (17, 34, 49), B (17, 39, 44), C (12, 44, 44),
D (7, 44, 49), E (7, 39, 54) and F (12, 34, 54).

In such optical disk, since the thin recording film 3 is disposed adjacent to the metallic reflecting film 5, heat diffusion effect is great. Therefore, the recording film 3 is rapidly cooled after having been heated. Accordingly, quantity of heat accumulated in the recording film 3 is reduced. As a result, not only distortion of shape of the recording mark can be restricted at a low linear speed of 1.2 to 1.4 m/sec. but excellent recording sensitivity, erasure ratio and thermal stability can be obtained by designating composition of the recording film 3 as described above.

Grounds for defining the constituent elements of the optical disk as described above are described, hereinbelow. Initially, composition of the recording film 3 is so defined as to fall in the region enclosed by the points A to F in FIG. 2 on the following ground. Namely, when composition of the recording film 3 is changed while maintaining the above mentioned structure of the optical disk, crystallizing speed is too high in an area in which Sb is present in an amount smaller than the line A-F, so that crystallization is likely to take place even after fusion of the recording film 3 and thus, shape of the amorphous recording mark is distorted. On the contrary, in an area in which Sb is present in an amount larger than the line C-D, crystallizing speed is too slow, so that the amorphous portion is not sufficiently crystallized and thus, a large portion is left unerased. Meanwhile, in an area in which Ge is present in an amount smaller than the line D-E, thermal stability of a recorded signal is poor due to low crystallization temperature. On the other hand, in an area in which Ge is present in an amount larger than the line A-B, recording sensitivity deteriorates due to high melting point. Furthermore, in an area in which Te is present in an amount larger than the line E-F, crystallizing speed is high and crystallization temperature is low, so that shape of the recording mark is distorted and thermal stability of the recorded signal deteriorates. On the contrary, in an area in which Te is present in an amount smaller than the line B-C, crystallizing speed is too low, so that the amorphous portion is not sufficiently crystallized and thus, a large portion is left unerased. Consequently, in structure of the optical disk in which the heat accumulation phenomenon is minimized, composition of the recording film 3 should fall in the region enclosed by the points A to F of FIG. 2.

Meanwhile, if only thickness of the recording film 3 is changed in the optical disk of the above described structure, not only absorption of the laser beam by the recording film 3 is poor but recording sensitivity deteriorates due to great heat diffusion effect when the recording film 3 has a thickness of less than 10 nm. On the other hand, when thickness of the recording film 3 exceeds 35 nm, thermal capacity of the recording film 3 becomes large and distortion of shape of the recording mark due to the heat accumulation phenomenon is increased. Therefore, the recording film 3 preferably has a thickness of 10-35 nm.

Similarly, thickness of the dielectric film 4 adjacent to the reflecting film 5 has been investigated. As a result, when the dielectric film 4 has a thickness of less than 5 nm, the recording film 3 is disposed too close to the reflecting film 5, so that the heat diffusion effect becomes excessively great, thereby resulting in deterioration of recording sensitivity. On the other hand, when thickness of the dielectric film 4 exceeds 40 nm, heat diffusion of the recording film 3 to the recording film 5 is reduced and thus, distortion of shape of the recording mark due to the heat accumulation phenomenon becomes large. Therefore, it is desirable that the dielectric film 4 has a thickness of 5-40 nm. Meanwhile, the dielectric films 2 and 4 may be made of one or a mixture of $SiO_2$, $SiO$, $Al_2O_3$, $GeO_2$, $TeO_2$, $MoO_3$, $WO_3$, $Si_3N_4$, AlN, BN, TiN, ZnS, ZnSe, ZnTe and SiC. However, it is preferable that material of the dielectric films 2 and 4 has excellent thermal stability and facilitates formation of the dielectric films 2 and 4. To this end, the dielectric films 2 and 4 are desirably made of at least one of $SiO_2$, ZnS, $Si_3N_4$, AlN, TiN and ZnSe, a mixture of ZnS and $SiO_2$ or a mixture of ZnSe and $SiO_2$.

Furthermore, thickness of the reflecting film 5 has been investigated. As a result, when the reflecting film 5 has a thickness of less than 35 nm, the heat diffusion effect of the reflecting film 5 is lessened and thus, distortion of shape of the recording mark due to the heat accumulation effect is increased. Therefore, the recording film 5 preferably has a thickness of 35 nm or more. It is desirable that composition of the reflecting film 5 has a large reflectance, has high thermal conductivity and facilitates formation of the reflecting film 5. To this end, the reflecting film 5 is preferably made of one or an alloy of at least Au, Al, Ti, Ni and Cr.

Then, the recording method of the present invention is described. Assuming that character T denotes a clock period, the EFM signal acting as CD standard is constituted by different pulses having 9 kinds of pulse widths of 3T to 11T. In a conventional recording method based on single beam overwriting, laser power is directly modulated between erasing level and recording level by the EFM signal such that signals are recorded on the optical disk. However, in this conventional recording method, the recording mark is greatly distorted into a teardrop-shape. Thus, the present inventors previously proposed in the earlier mentioned U.S. Patent Application, a recording method which lessens distortion of the recording mark. In this known recording method, at the time of single beam overwriting, a recording pulse forming one recording mark is converted into a pulse train constituted by a plurality of short pulses of specific shape such that signals are recorded. Hereinbelow, this known recording method is referred to as a "multi-pulse (MP) recording method". The recording method of the present invention is obtained by extracting from the multi-pulse recording method, elements especially effective for the optical disk of the present invention and defining the elements.

Namely, in the recording method of the present invention, each of pulses contained in a digital signal is initially converted into a pulse train constituted by a plurality of pulses. Then, laser power is modulated between erasing level and recording level by the pulse train. When one recording mark is formed on the optical disk by each pulse train so as to record the digital signal, the pulse train is constituted by a leading pulse and a subsequent pulse train. Width of the leading pulse is fixed at all times and is larger than that of each of the pulses in the subsequent pulse train. Furthermore, the pulses in the subsequent pulse train have an identical width and an identical interval. In the case where the recording mark having n-th length (n=natural number) is formed, the number of the pulses in the subsequent pulse train is (n-1).

Figure 3:
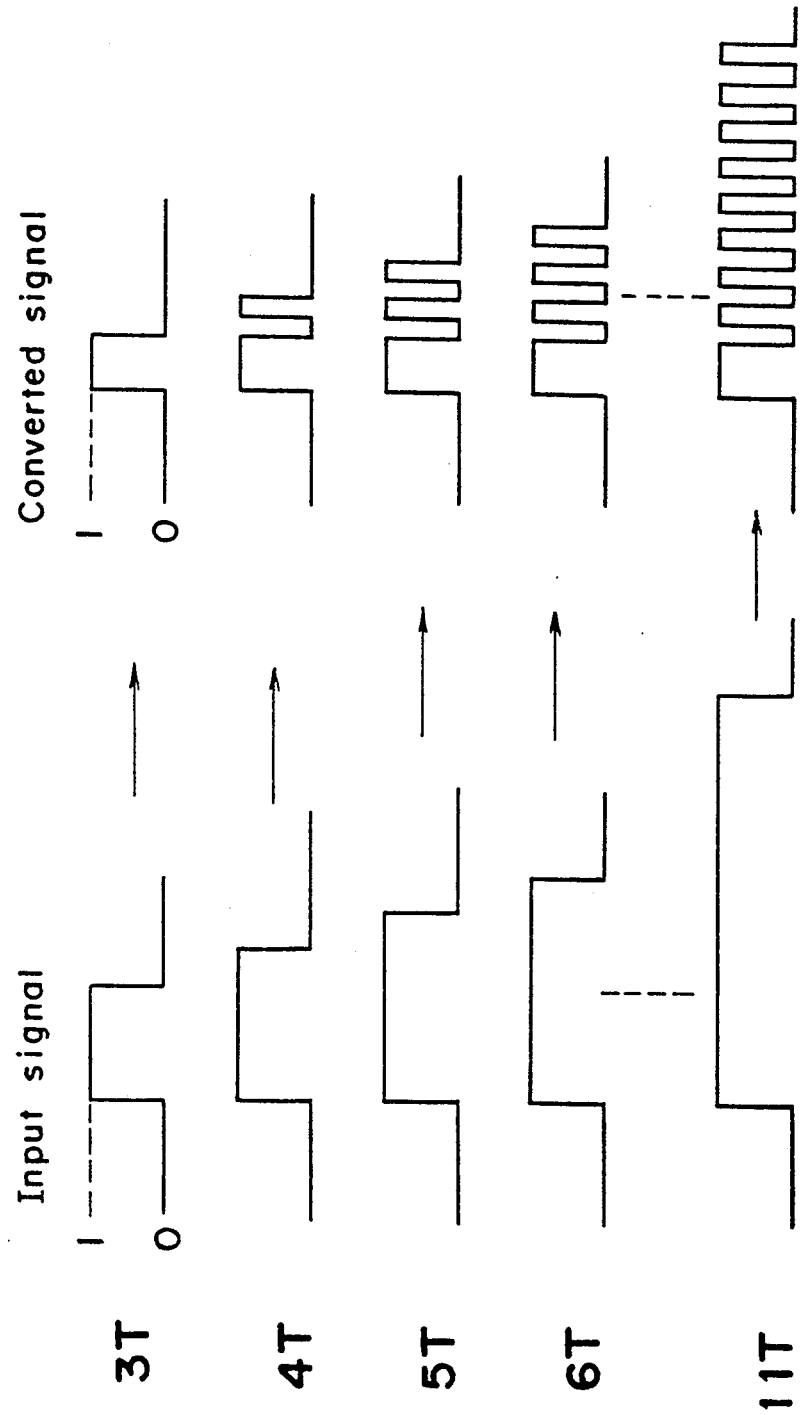

In 9 kinds of the pulses contained in the EFM signal and having different widths of 3T to 11T as shown in FIG. 3, the pulse having the width of 3T is converted into a pulse train formed by a leading pulse having a large width. Meanwhile, the pulse having the width of 4T is converted into a pulse train in which the subsequent pulse train formed by one narrow pulse is added to the leading pulse and the pulse having the width of 5T is converted into a pulse train in which the subsequent pulse train formed by the two narrow pulses are added to the leading pulse. Likewise, the pulse having the width of 11T is converted into a pulse train in which the subsequent pulse train formed by the eight narrow pulses are added to the leading pulse. In order to record signals by modulating laser power between recording level and erasing level by these pulse trains, wave form of an input signal as shown in FIG. 4a is irradiated onto the optical disk by laser output shown in FIG. 4b such that a new signal is recorded on the optical disk while a signal recorded preliminarily on the optical disk is being erased. In order to modulate laser power, it may also be possible to employ a method shown in FIG. 4c in which laser power is modulated between a recording level Pp and a reproducing level Pr or an OFF level only during a period of the pulse train.

Meanwhile, in the case where a signal is recorded by single beam overwriting, the old signal may be left unerased. If an unerased portion of the old signal is large, jitter is increased. It is considered that the unerased portion of the old signal is produced due to nonuniformity of crystalline state on recording tracks. Therefore, before laser beam is modulated by the above mentioned method so as to record a signal, laser power is continuously irradiated onto the optical disk by maintaining its power level at a fixed value equal to or higher than that for fusing the recording film. Since all crystals on the recording tracks are fused, nonuniformity of crystalline state on the recording tracks is eliminated and thus, the old signal is erased completely. At this time after fusion of the recording film, the recording film may be either in amorphous state or in crystalline state. It is because both amorphous state and crystalline state can be achieved by a recording laser beam to be emitted thereafter.

Meanwhile, this erasure of the old signal through fusion of the crystals on the recording tracks may also be performed by continuous irradiation of a recording laser spot. Then, the new signal is recorded by using the recording laser spot again or another laser spot preceding the recording laser spot.

Hereinbelow, concrete examples 1-12 of the present invention are described.

EXAMPLE 1

Initially, effectiveness of the optical disk and the optical information recording method according to the present invention is shown in comparison with the prior art. To this end, an optical disk A of the present invention and a known optical disk B are prepared. After an EFM signal has been recorded on the optical disk A and the prior art optical disk B by the recording method of the present invention and the known recording method, respectively, the EFM signal is reproduced and jitter of the reproduced signal is compared between the present invention and the prior art.

The optical disk A has structure shown in FIG. 1. The substrate 1 which is preliminarily provided with recording tracks has a diameter of 120 mm and is made of polycarbonate. The recording film 3 has a composition of $Ge_{12}Sb_{39}Te_{49}$ and has a thickness of 20 nm. The dielectric films 2 and 4 are formed by mixture of ZnS and $SiO_2$ of 20 mol % and have thicknesses of 150 nm and 12 nm, respectively. The reflecting film 5 is made of Au and has a thickness of 50 nm. In this example, in order to protect these thin films, a protective cover made of polycarbonate is bonded to the optical disk A. The protective cover may be replaced by so-called hard coat obtained by applying and then, curing resin or may be eliminated. The protective cover does not constitute subject matter of the present invention. Since the recording tracks are rotated at a fixed linear speed of 1.25 m/sec. at any location on the optical disk A, so-called wobbling grooves which are so modulated as to obtain a frequency of 22.05 kHz during rotation at a speed of 1.25 m/sec. are employed as the recording tracks.

Figure 18:
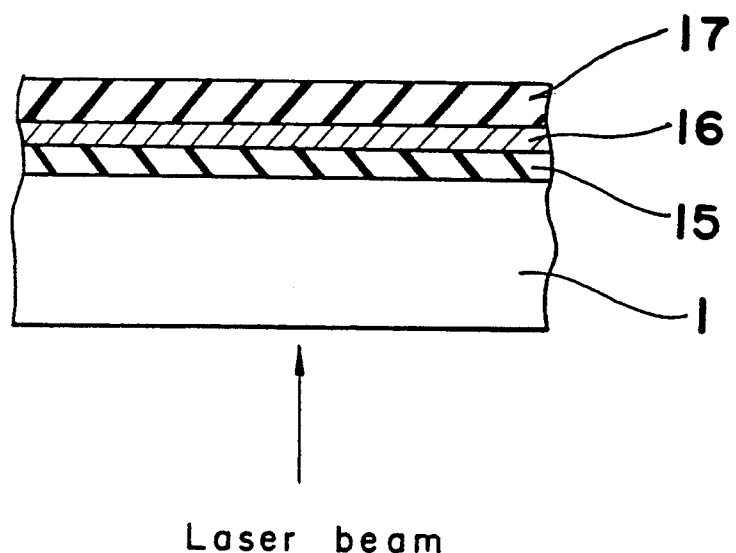
FIG. 18 is a sectional view of the prior art optical disk of FIG. 17 (already referred to)
Figures 19A, 19B, 19C:
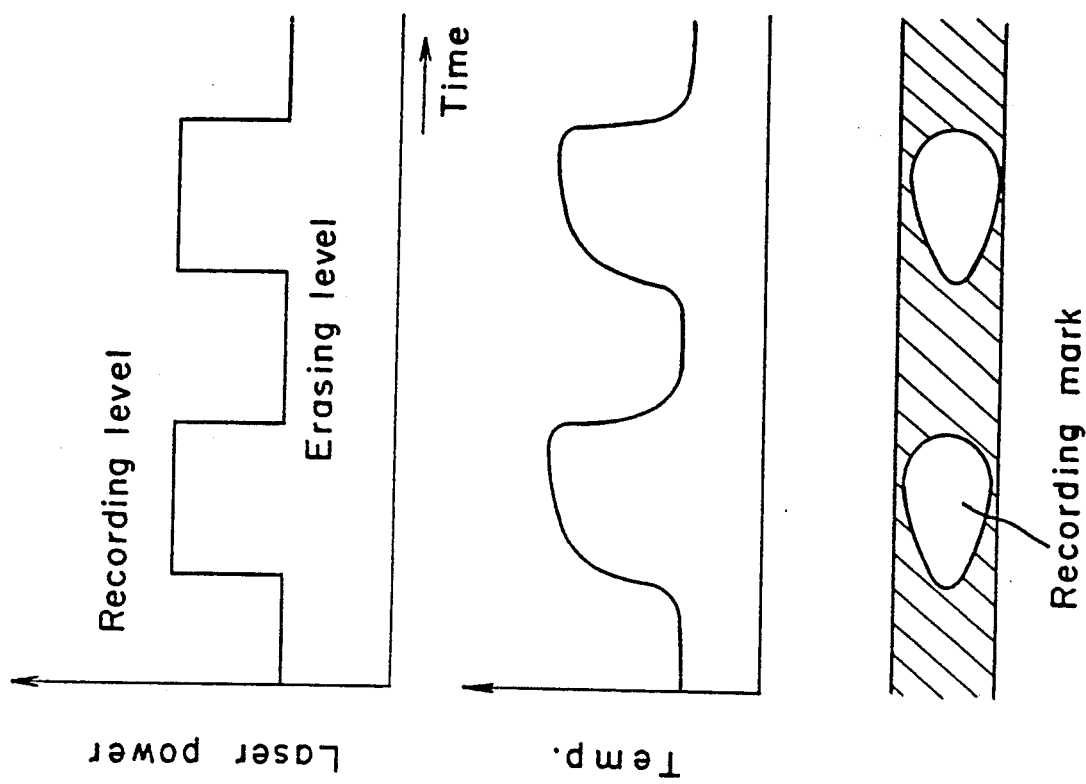
FIGS. 19a to 19c are views explanatory of a cause of distortion of shape of a recording mark in the prior art optical disk of FIG. 18 (already referred to).

On the other hand, the known optical disk B has structure shown in FIG. 18. Compositions of the substrate 1, the recording film 16 and the dielectric films 15 and 17 are the same as those of the optical disk A. The dielectric film 15 has a thickness of 100 nm, while the dielectric film 17 has a thickness of 200 nm. The recording film 16 has a thickness of 100 nm. In order to protect also the optical disk B, a protective cover made of polycarbonate is bonded to the optical disk B.

Figures 5A, 5B:
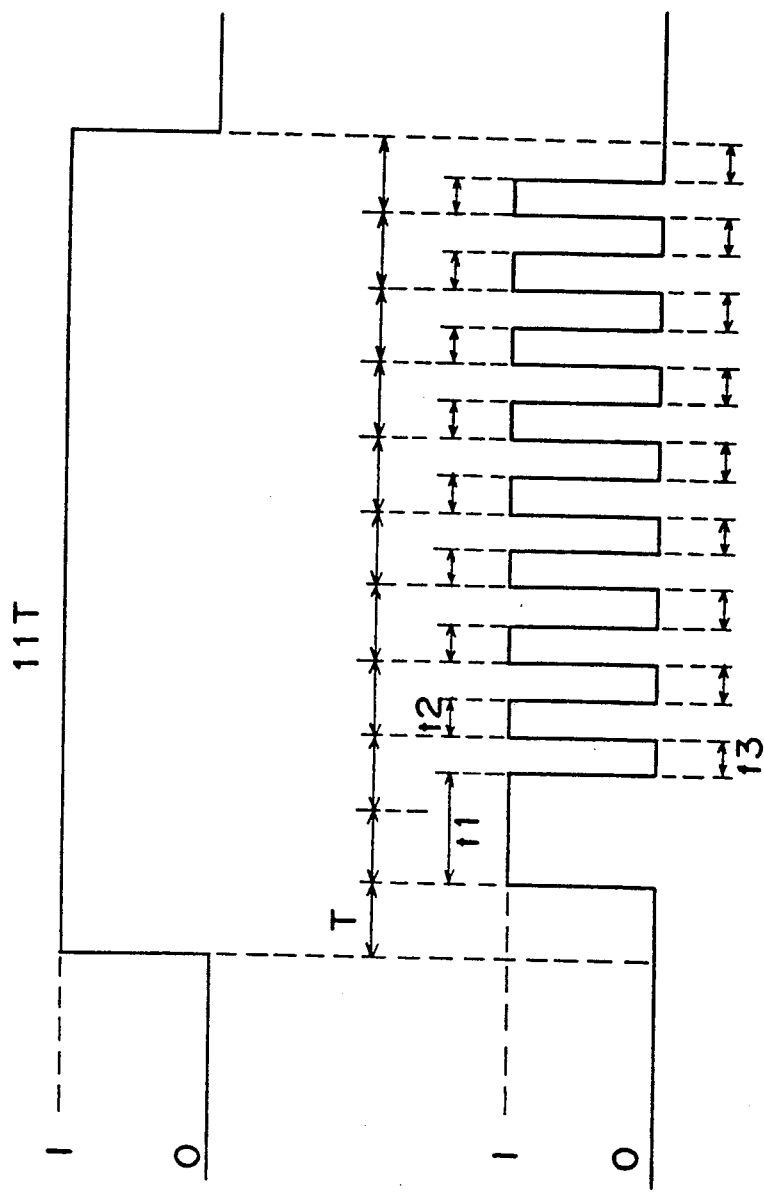

For recording, the known recording method in which power modulation of a laser beam is directly performed between recording level and erasing level by the EFM signal and the multi-pulse recording method in which after conversion of the EFM signal into the pulse trains according to the present invention, the laser beam is modulated are employed. In the multi-pulse recording method, since the input pulses having the widths of 3T to 11T are converted into the pulse trains by a predetermined rule, it becomes possible to determine all the pulse trains from a width t1 of the leading pulse and a width t2 of each of the pulses of the subsequent pulse train as shown in FIG. 5b. Namely, when wave form of the input pulse having the width of 11T shown in FIG. 5a is converted into the pulse train as shown in FIG. 5b, all the pulse trains corresponding to the input pulses having the widths of 3T to 11T, respectively can be determined from the width t1 of the leading pulse and the width t2 of the pulses of the subsequent pulse train since an interval t3 between the leading pulse and a foremost one of the puses of the subsequent pulse train or between neighboring ones of the pulses of the subsequent pulse train is obtained from the equation: $t3 = T - t2$.

Figure 6:
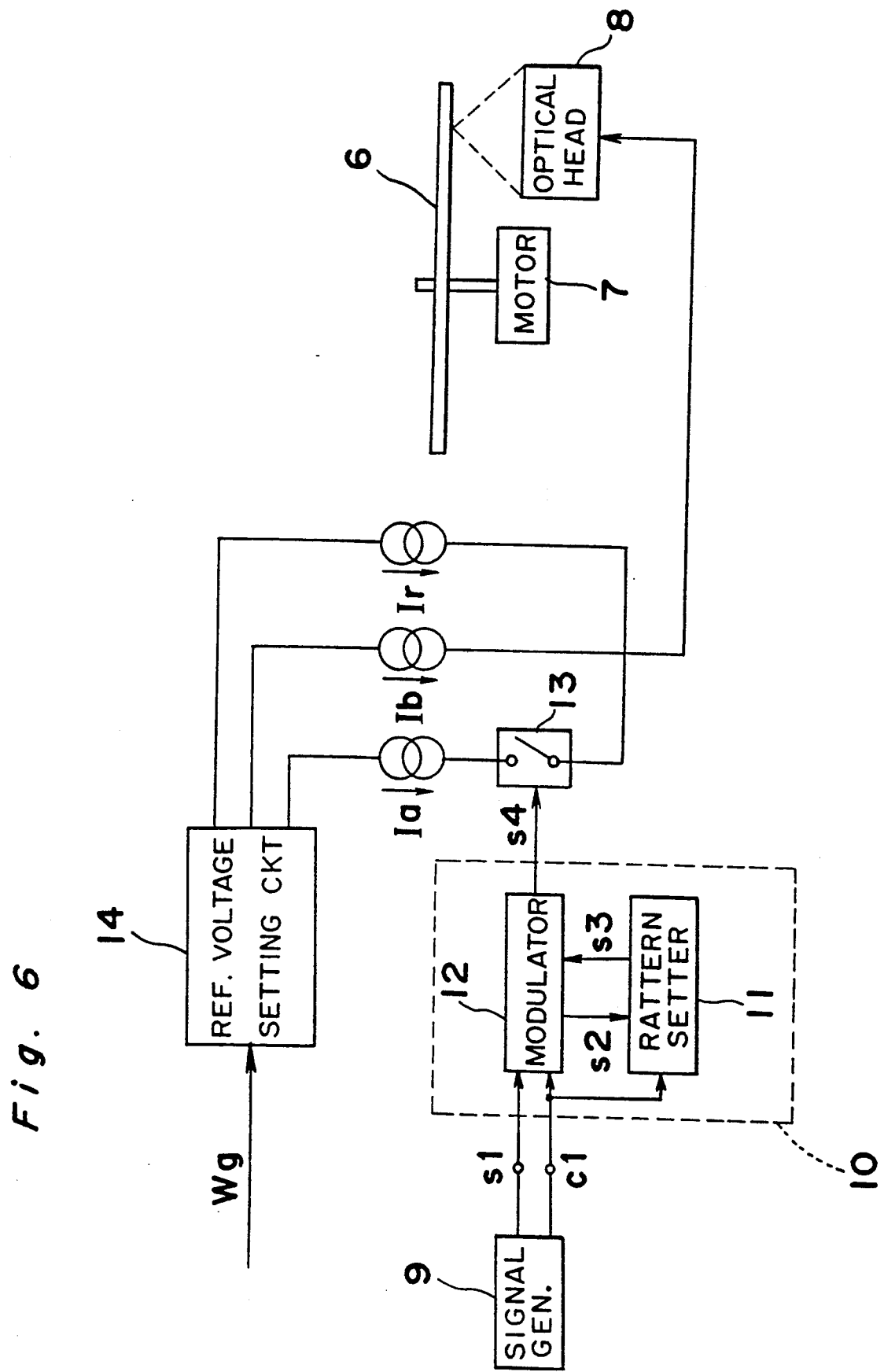
FIG. 6 is a schematic view showing one example of a recording apparatus employed in the optical information recording method of the present invention.

FIG. 6 shows a recording apparatus for obtaining wave form of FIG. 4b, according to the present invention. In FIG. 6, an optical disk 6 is rotated by a spindle motor 7 at a fixed relative speed between a laser spot from an optical head 8 and the optical disk 6, i.e. at a fixed linear speed of 1.25 m/sec. In order to maintain the linear speed at a fixed value at any location on the optical disk 6, modulated signals of the wobbling grooves are optically reproduced and rotational speed is controlled such that the reproduced signals have a frequency of 22.05 kHz at all times. When signals are recorded on the optical disk 6, an EFM signal from a signal generator 9 is converted into a pulse train signal s4 by a multi-pulse circuit 10. The multi-pulse circuit 10 includes a pattern setter 11 and a modulator 12. In the pattern setter 11, a pattern of the pulse train corresponding to the pulse having the largest width of 11T is set in advance. The modulator 12 detects a pulse width of the EFM signal s1 and fetches a necessary length from the head of the set pattern of the pattern setter 11 in accordance with the detected pulse width so as to generate and output a pulse train. In order to prevent an edge position of the input signal from the signal generator 9 from being displaced through modulation of the input signal into the pulse train, the signal generator 9, the modulator 12 and the pattern setter 11 are synchronized by an identical clock C1 such that jitter of the reproduced signals is restricted.

Meanwhile, at the time of reproduction of the signal, current Ir flows through a semiconductor laser in the optical head 8 so as to obtain the reproducing level Pr. However, during recording of the signal, namely at the time of input of a recording gate signal Wg, bias current Ib flows through the semiconductor laser in the optical head 8 so as to obtain an erasing level Pb and further, current Ia for obtaining the recording level Pp flows therethrough additionally when a switch 13 has been actuated by the pulse train signal s4. Therefore, at the time of recording of the signal, laser power is modulated between the erasing level Pb and the recording level Pp on the basis of wave form of the pulse train. A reference voltage setting circuit 14 is provided for generating a voltage necessary for obtaining the currents Ir, Ia and Ib. Furthermore, the semiconductor laser in the optical head 8 has a wavelength of 830 nm and an objective lens of the optical head 8 has a numerical aperture (NA) of 0.5.

In this example, the pulse train of FIG. 5b has the width t1 of 348 nsec., the width t2 of 116 nsec. and the clock period T of 232 nsec. Meanwhile, in the prior art recording method, laser power is modulated by directly actuating the switch 13 by the EFM signal s1. In combinations of the optical disk A of the present invention, the known optical disk B, the multi-pulse recording method of the present invention and the known recording method, a signal overwritten 10 times on an identical recording track is reproduced and magnitude of jitter of the reproduced signal is measured by using a compact disk jitter meter "MJM-631" (name used in trade and manufactured by Meguro Electric Co., Ltd. of Japan).

Table 1 below shows results of the measurement. Each of values of jitter indicated in Table 1 is a minimum jitter obtained by changing the erasing level Pb and the recording level Pp in the combination of the optical disk and the recording method. The laser powers Pb and Pp yielding the minimum jitter are also shown in Table 1. The laser powers Pb and Pp are values measured on the surface of the optical disk. As will be seen from Table 1, jitter is quite large in the combination of the known optical disk B and the known recording method. However, in the combination of the known optical disk B and the multi-pulse (MP) recording method of the present invention and the combination of the optical disk A of the present invention and the known recording method, jitter is considerably reduced. Furthermore, in the combination of the optical disk A of the present invention and the multi-pulse recording method of the present invention, jitter is remarkably reduced. Therefore, in order to reduce jitter, it is of deep significance to simultaneously employ the optical disk A of the present invention and the multi-pulse recording method of the present invention.

TABLE 1

| Optical disk | Recording method | Jitter (nsec.) | Laser power Pb(mW) | Laser power Pp(mW) |
| --- | --- | --- | --- | --- |
| B | Prior art | 75 | 3.0 | 4.8 |
| B | MP | 48 | 3.0 | 5.3 |
| A | Prior art | 46 | 4.5 | 7.6 |
| A | MP | 21 | 4.5 | 8.4 |

Hereinbelow, the examples in which structure of the optical disk is further defined are described in detail. As is seen from Table 1, jitter is made smaller in the multi-pulse recording method than in the known recording method. Therefore, in the examples 2-8, the multi-pulse recording method having an identical wave form is employed.

EXAMPLE 2

In this example, composition of the recording film 3 is so defined as to fall in the region enclosed by the points A–f of FIG. 2. The present inventors previously disclosed in "JJAP, Vol. 26 (1987) Suppl. 26-4, p61–66" that in GeSbTe alloy, three kinds of compounds which crystallize at high speed from amorphous state, i.e. $GeSb_4Te_7$, $GeSb_2Te_4$ and $Ge_2Sb_2T_5$ exist on a line connecting GeTe and $Sb_2Te_3$ and these compounds not only have excellent recording and erasing characteristics and excellent repetition characteristics. But, crystallizing speed of the recording film becomes lower as the compositions are farther away from the line connecting GeTe and $Sb_2Te_3$. Since crystallizing speed on the line connecting GeTe and $Sb_2Te_3$ is too high for the linear speed of the compact disk, it is difficult to convert the recording film into amorphous state.

Therefore, the present inventors have attempted to lower crystallizing speed of the recording film by adding $GeSb_2Te_4$ to Sb. $GeSb_2Te_4$ has a higher crystallization temperature than that of $GeSb4Te_7$ and is thermally stable. $GeSb_2Te_4$ further has a lower melting point than that of $Ge_2Sb_2Te_5$ and has a higher recording sensitivity than $Ge Sb_2Te_5$. By making structure of the optical disk identical with that of the optical disk A of the example 1, only composition of the recording film is changed on a line connecting $GeSb_2Te_4$ and Sb. Jitter of the thus manufactured optical disk is measured in a method similar to that of the example 1.

Characteristics required of the optical disk include thermal stability and recording sensitivity. For examining thermal stability, after the optical disk has been allowed to stand at 80° C. for 10 days after recording of signals, jitter of the optical disk is measured again such that change of jitter is obtained. Recording sensitivity is represented by the recording level Pp at which jitter assumes a minimum.

Figure 7:
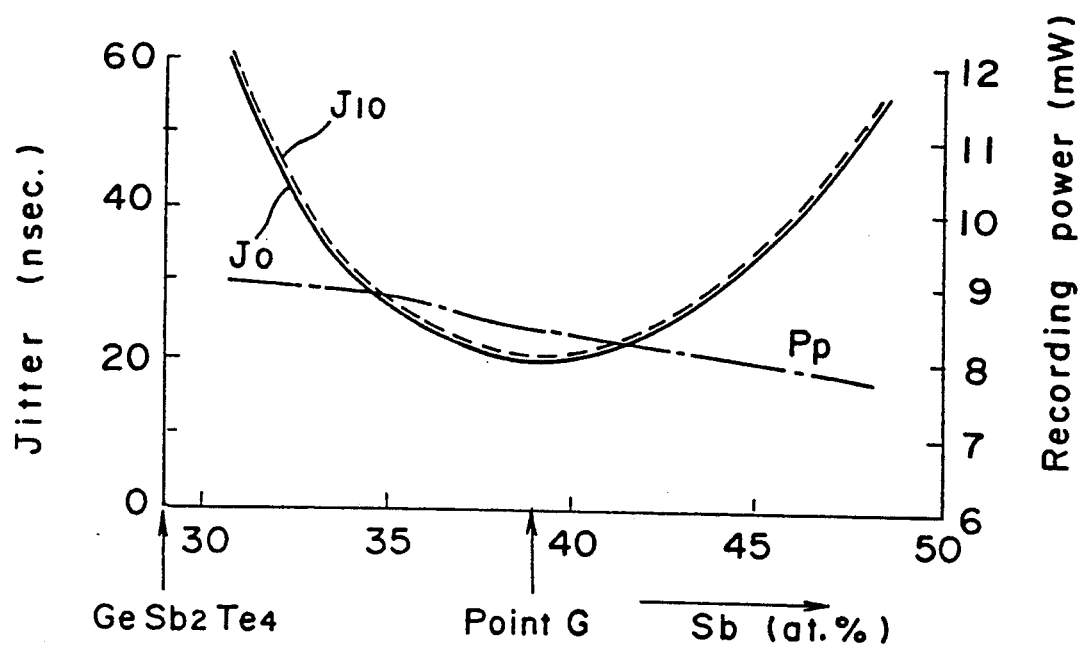
FIGS. 7 to 12, 13a and 13b are graphs showing data for determining constituent elements of the optical disk of FIG. 1, respectively.

FIG. 7 shows results of the measurement. Jitter J0 measured immediately after recording assumes a minimum value in the vicinity of 39 atomic % of Sb, i.e. the point G of FIG. 2. If quantity of Sb is made smaller than the point G, crystallizing speed becomes too high and thus, shape of the recording mark is distorted. On the other hand, when quantity of Sb is made larger than the point G, crystallizing speed becomes low, so that erasure ratio deteriorates and thus, recording is adversely affected by the previously recorded signals. In view of compact disk standards, it is preferable that jitter is not more than 30 nsec. Meanwhile, in this range of composition of the recording film, jitter J10 measured at the time when the optical disk has been allowed to stand at 80° C. for 10 days after recording shows substantially no difference from the jitter J0 measured immediately after recording. By considering that output of inexpensive semiconductor lasers commercially available at present is not more than 20 mW, recording sensitivity on the surface of the optical disk may be not more than 10 mW and this requirement of recording sensitivity is satisfied by this range of composition of the recording film.

From the above, it is concluded that composition of the recording film, which falls on the line connecting GeSb$_2$Te$_4$ and Sb and is suitable for heat diffusion and the recording method according to the present invention, is 34–44 atomic % of Sb.

EXAMPLE 3

In this example, effect of addition of Ge around the point G of the example 2 is revealed. Structure of the optical disk is identical with that of the example 2. By changing composition of the recording film on a line connecting Ge and Ge$_{12}$Sb$_{39}$Te$_{49}$ (point G), signals are recorded in a recording method similar to that of the example 2 and jitter of the reproduced signals is measured. Furthermore, thermal stability and recording sensitivity of the optical disk are also measured.

Figure 8:
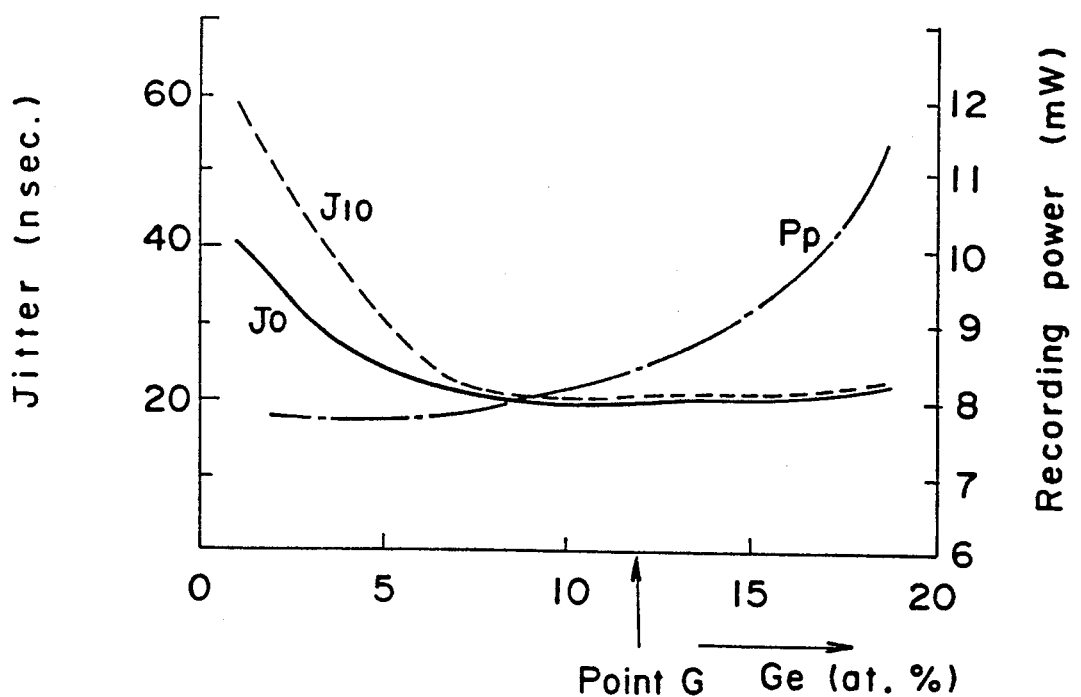

FIG. 8 shows results of the measurement. The jitter J0 measured immediately after recording is not more than 30 nsec. when quantity of Ge is 3 atomic % or more and the crystallizing speed is suitable for the optical disk and the recording method according to the present invention. However, the jitter J10 measured at the time when the optical disk has been allowed to stand at 80° C. for 10 days after recording exceeds the jitter J0 when quantity of Ge is less than 7 atomic %. This phenomenon may take place because the optical disk becomes thermally unstable due to drop of the crystallization temperature. On the contrary, when quantity of Ge is increased, recording sensitivity deteriorates, so that the recording power Pp is to be increased. Thus, when quantity of Ge exceeds 17 atomic %, the recording power Pp exceeds 10 mW probably due to rise of melting point of the recording film.

From the above, it is concluded that composition of the recording film, which falls on the line connecting Ge and Ge$_{12}$Sb$_{39}$Te$_{49}$ and is suitable for heat diffusion and the recording method according to the present invention, is 7–17 atomic % of Ge.

EXAMPLE 4

In this example, effect of addition of Te around the point G of the example 2 is revealed. Structure of the optical disk is the same as that of the example 2. By changing composition of the recording film on a line connecting Te and Ge$_{12}$Sb$_{39}$Te$_{49}$ (point G), signals are recorded in a recording method similar to that of the example 2 and jitter of the reproduced signals is measured. Furthermore, thermal stability and recording sensitivity of the optical disk are also measured.

Figure 9:
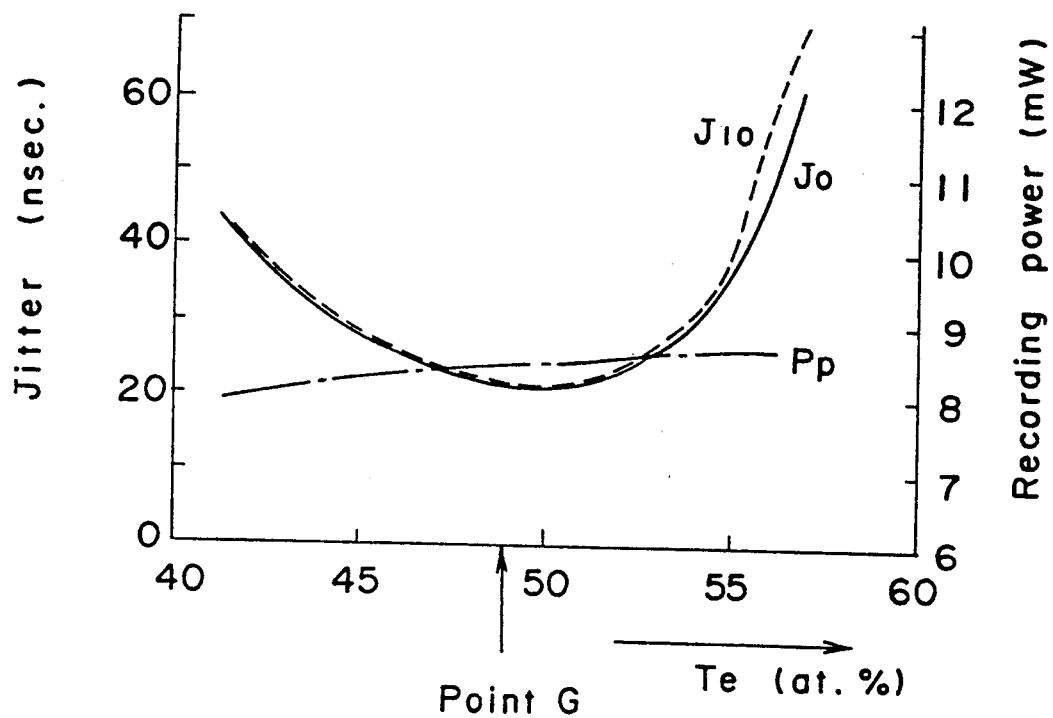

FIG. 9 shows results of the measurement. The jitter J0 measured immediately after recording assumes a minimum value when quantity of Te is around 50 atomic %. When quantity of Te is increased more than 50 atomic %, crystallizing speed becomes too high and thus, shape of the recording mark is distorted. When quantity of Te is made smaller than 50 atomic %, crystallizing speed becomes low, so that erasure ratio deteriorates and thus, recording is adversely affected by the previously recorded signals.

Meanwhile, the jitter J10 measured at the time when the optical disk has been allowed to stand at 80° C. for 10 days after recording exceeds the jitter J0 when quantity of Te is more than 55 atomic %. This phenomenon may take place because the optical disk becomes thermally unstable due to drop of crystallization temperature. In this range of composition of the recording film, recording sensitivity does not depend on quantity of Te so much.

From the above, it is concluded that composition of the recording film, which falls on the line connecting Te and Ge$_{12}$Sb$_{39}$Te$_{49}$ and is suitable for heat diffusion and the recording method according to the present invention, is 44–54 atomic % of Te.

From the examples 2–4, it can be understood that composition of the GeSbTe alloy suitable for heat diffusion and the recording method according to the present invention falls in a region which not only includes Ge$_{12}$Sb$_{39}$Te$_{49}$ (point G) but is bounded by $7 \leq Ge \leq 17$ atomic %, $34 \leq Sb \leq 44$ atomic % and $44 \leq Tes \leq 54$ atomic %, namely the region enclosed by the points A–F of FIG. 2.

EXAMPLE 5

In this example, thickness of the recording film is determined. Structure of the optical disk and composition of the recording film are made identical with those of the optical disk A of the example 1 and only thickness of the recording film is changed. Then, signals are recorded in a recording method similar to that of the example 2 such that jitter of the reproduced signals and recording sensitivity of the optical disk are measured.

Figure 10:
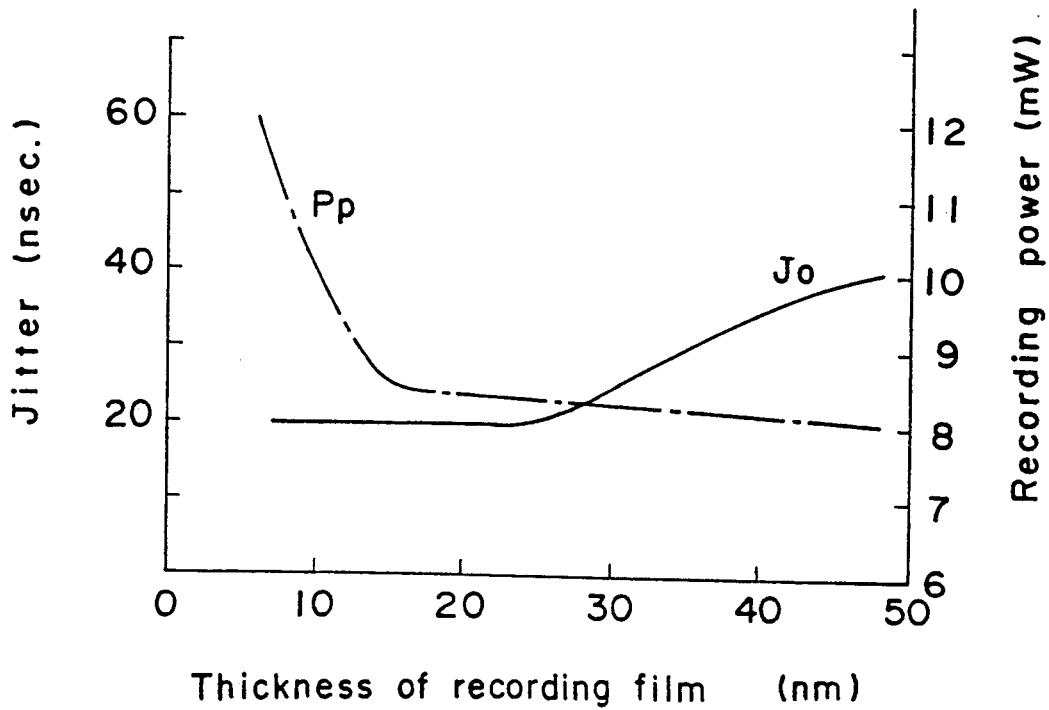

FIG. 10 shows results of the measurement. The jitter J0 measured immediately after recording is fixed at a minute value of about 20 nsec. when thickness of the recording film is not more than 25 nm. However, when thickness of the recording film exceeds 25 nm, jitter is increased. Thus, when thickness of the recording film is 35 nm or more, jitter exceeds 30 nsec. This phenomenon may take place because heat accumulation is caused by increase of heat capacity of the recording film and thus, distortion of shape of the recording mark is increased. On the contrary, when thickness of the recording film is smaller than 15 nm, recording sensitivity deteriorates. Thus, when thickness of the recording film is less than 10 nm, the recording power Pp exceeds 10 mW. This may be because when thickness of the recording film is less than 10 nm, absorption of laser beams by the recording film is poor and heat diffusion effect is enhanced.

Namely, from a standpoint of both jitter and recording sensitivity, thickness of the recording film of GeSbTe alloy suitable for heat diffusion and the recording method according to the present invention should range from 10 to 35 nm, preferably from 15 to 25 nm.

EXAMPLE 6

In this example, range of thickness of the dielectric film 4 adjacent to the reflecting film 5 is determined. Structure of the optical disk and composition of the recording film are made identical with those of the optical disk A of the example 1 and only thickness of the dielectric film 4 is changed. Then, signals are recorded in a recording method similar to that of the example 2 such that jitter of the reproduced signals and recording sensitivity of the optical disk are measured.

Figure 11:
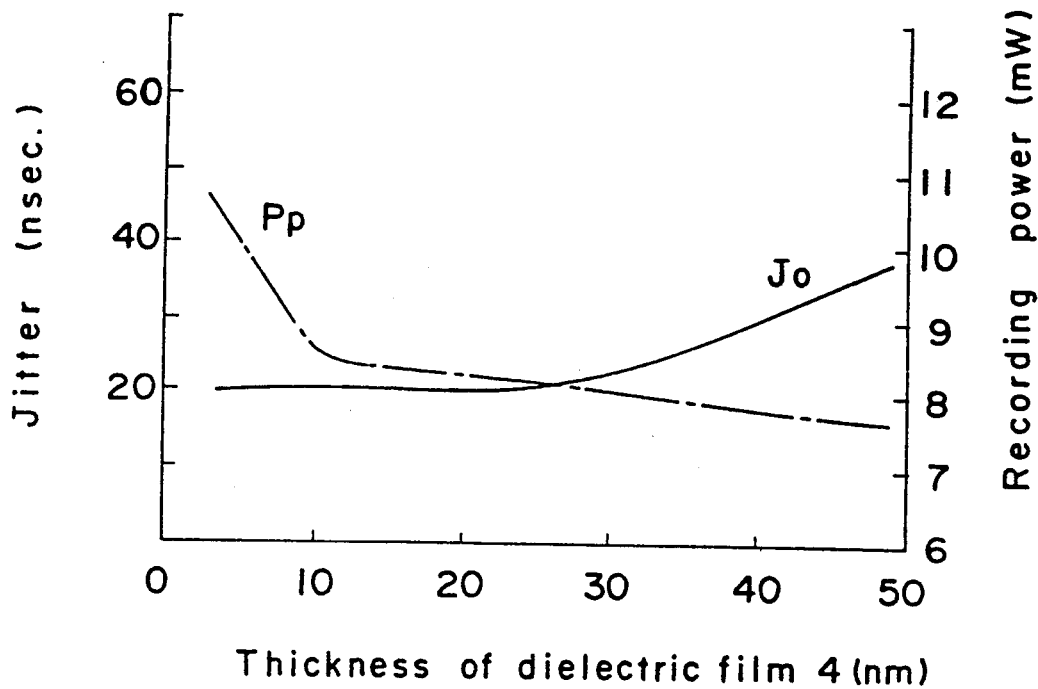

FIG. 11 shows results of measurement. The jitter J0 measured immediately after recording is fixed at a minute value of about 20 nsec. when thickness of the dielectric film 4 is not more than 25 nm. However, when thickness of the dielectric film 4 exceeds 25 nm, the jitter J0 is increased. Thus, when thickness of the dielectric film 4 exceeds 40 nm, the jitter J0 exceeds 30 nsec. This phenomenon may take place because heat accumulation is caused by decrease of heat diffusion from the recording film to the reflecting film 5 and thus, distortion of shape of the recording mark is increased. Meanwhile, on the contrary, when thickness of the dielectric film 4 is less than 10 nm, recording sensitivity deteriorates. Thus, when thickness of the dielectric film 4 is less than 5 nm, the recording power Pp exceeds 10 mW. This may be because the recording film is disposed too close to the reflecting film 5 and thus, heat diffusion effect is enhanced excessively.

Namely, from a viewpoint of both jitter and the recording sensitivity, thickness of the dielectric film 4 suitable for heat diffusion and the recording method according to the present invention should range from 5 to 40 nm, preferably from 10 to 25 nm.

EXAMPLE 7

In this example, range of thickness of the reflecting film 5 is determined. Structure of the optical disk and composition of the recording film are made identical with those of the optical disk A of the example 1 and only thickness of the reflecting film 5 is changed. Then, signals are recorded in a recording method similar to that of the example 2 such that jitter of the reproduced signals and recording sensitivity of the optical disk are measured.

Figure 12:
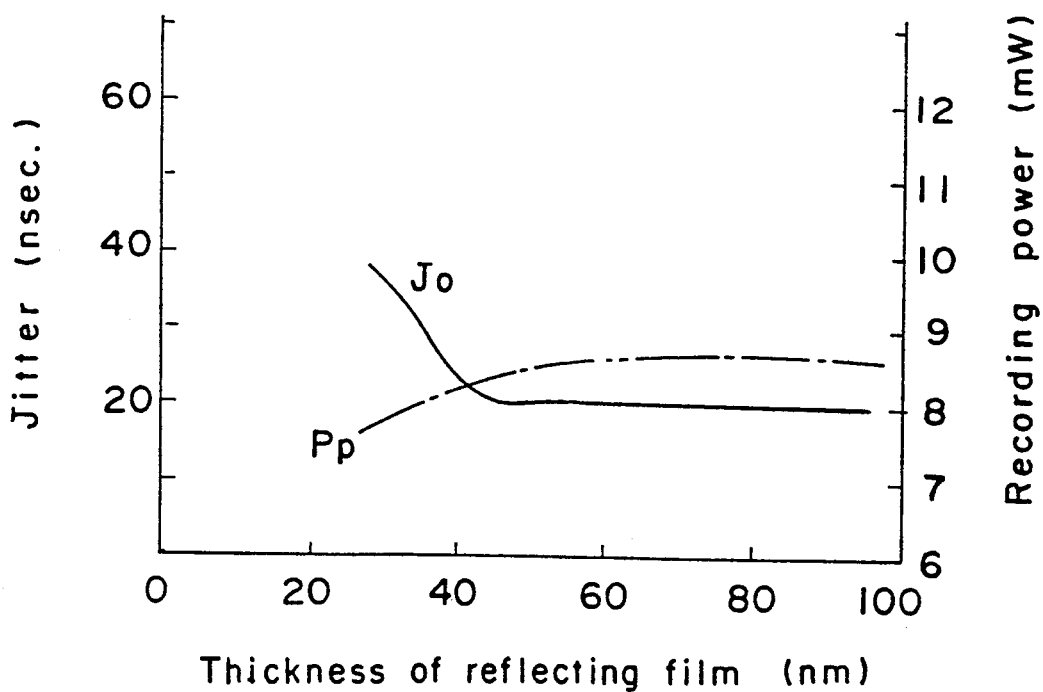

FIG. 12 shows results of the measurement. The jitter J0 measured immediately after recording is fixed at a minute value of about 20 nsec. when thickness of the reflecting film 5 is not less than 45 nm. However, when thickness of the reflecting film 5 is less than 45 nm, the jitter J0 is increased. Thus, when thickness of the reflecting film 5 is less than 35 nm, the jitter J0 exceeds 30 nsec. This phenomenon may take place because heat accumulation is caused by decrease of heat diffusion from the reflecting film 5 and thus, distortion of shape of the recording mark is increased. Meanwhile, as thickness of the reflecting film 5 is increased, recording sensitivity deteriorates further. However, the recording power Pp is substantially saturated when thickness of the reflecting film 5 is 45 nm or more.

Namely, from a standpoint of both jitter and recording sensitivity, thickness of the reflecting film 5 suitable for heat diffusion and the recording method according to the present invention should be not less than 35 nm, preferably not less than 45 nm.

EXAMPLE 8

Figure 13A:
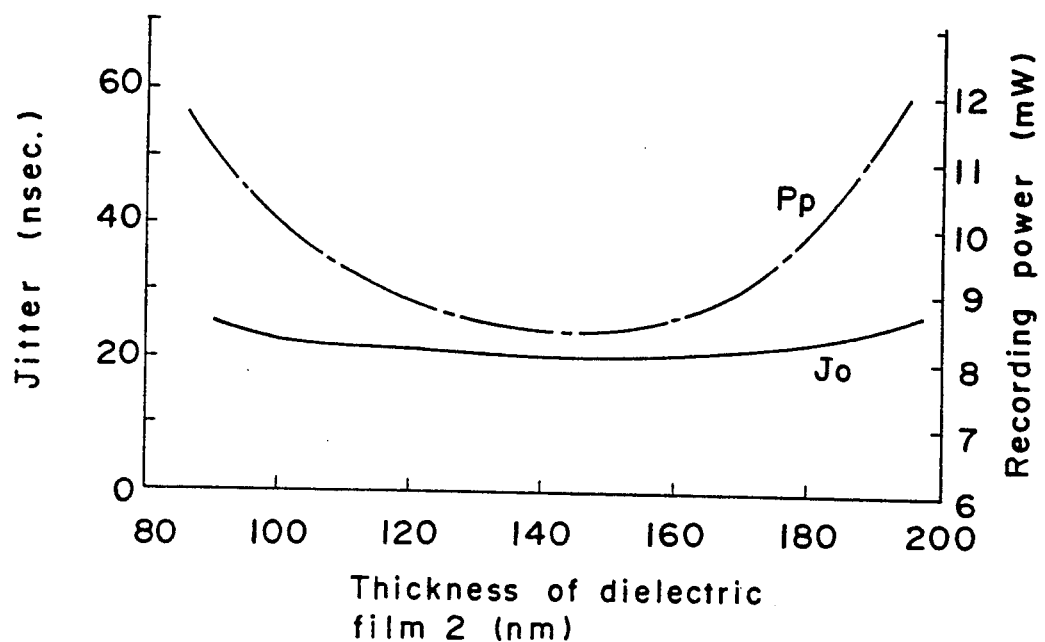

In this example, thickness of the dielectric film 2 adjacent to the substrate 1 is determined. Thickness of the dielectric film 2 does not exercise a great effect on heat diffusion characteristics of the optical disk but has an effect on optical characteristics of the optical disk, for example, reflectance or CNR (carrier-to-noise ratio). Structure of the optical disk and composition of the recording film are made identical with those of the optical disk A of the example 1 and only thickness of the dielectric film 2 is changed. Then, signals are recorded in a recording method similar to that of the example 2 such that jitter of the reproduced signals and recording sensitivity of the optical disk are measured FIG. 13a shows results of the measurement. The jitter J0 measured immediately after recording does not depend on thickness of the dielectric film 2 so much and has excellent values in a rather wide range. Meanwhile, when thickness of the dielectric film 2 is less than 100 nm or exceeds 180 nm, the recording power Pp exceeds 10 mW, thereby resulting in deterioration of recording sensitivity. This phenomenon may take place because when thickness of the dielectric film 2 is less than 100 nm or exceeds 180 nm, reflectance of the optical disk is increased and thus, absorption ratio of the irradiated laser power at the recording film 3 drops.

Namely, from a viewpoint of both jitter and recording sensitivity, thickness of the dielectric film 2 suitable for heat diffusion and the recording method according to the present invention should range from 100 to 180 nm when the reflecting film 5 is made of Au.

However, it has been found that when material of the reflecting film 5 is changed, the optimum thickness of the dielectric film 2 varies from that in the case of the reflecting film 5 made of Au. Hereinbelow, the optimum thickness of the dielectric film 2 in the case where the reflecting film 5 is made of Al is described. An experiment for determining range of thickness of the dielectric film 2 is conducted in the same manner as that of FIG. 13a. Material and thickness of the reflecting film 5 are changed from Au to Al and from 50 to 250 nm, respectively. Other structure of the optical disk and composition of the recording film 3 are the same as those of FIG. 13a. Only thickness of the dielectric film 2 is changed and signals are recorded in a recording method similar to that of FIG. 13a such that jitter and recording sensitivity of the optical disk are measured.

Figure 13B:
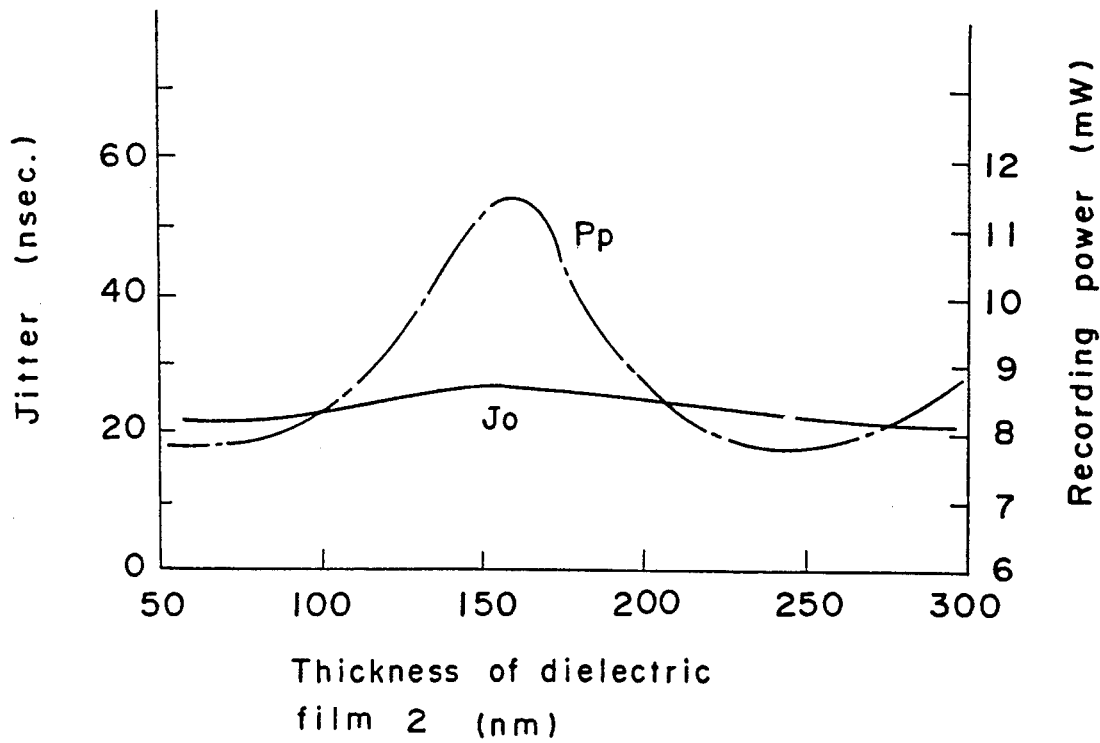

FIG. 13b shows results of the measurement. The jitter J0 does not depend on thickness of the dielectric film 2 so much and has excellent values in a rather wide range. Meanwhile, when thickness of the dielectric film 2 is more than 130 nm and less than 180 nm, the recording power Pp exceeds 10 mW, thereby resulting in deterioration of recording sensitivity. This phenomenon may take place because in the case where the reflecting film 5 is made of Al, reflectance of the optical disk is increased when thickness of the dielectric film 2 is more than 130 nm and less than 180 nm, so that absorption ratio of the irradiated laser power at the recording film 3 deteriorates.

Namely, in the case where the reflecting film 5 is made of Al, thickness of the dielectric film 2 suitable for heat diffusion and the recording method according to the present invention should be not more than 130 nm or not less than 180 nm in a range of 50–300 nm employed in the experiment from a standpoint of jitter and recording sensitivity.

In the foregoing examples 2 to 8, the constituent elements of the optical disk have been defined. In the following examples, ranges of the width t1 of the leading pulse and the width t2 of each of the pulses of the subsequent pulse train in the pulse train of FIG. 5b most characteristic of the optical information recording method of the present invention are determined.

EXAMPLE 9

In this example, the width t1 of the leading pulse is changed in the pulse train shown in FIG. 5b by maintaining the width t2 of each of the pulses of the subsequent pulse train and the clock period T at 116 nsec. and 232 nsec., respectively and signals are recorded on the optical disk such that jitter of the reproduced signals and recording sensitivity of the optical disk are measured. The optical disk A of the example 1 is employed as the optical disk.

Figure 14:
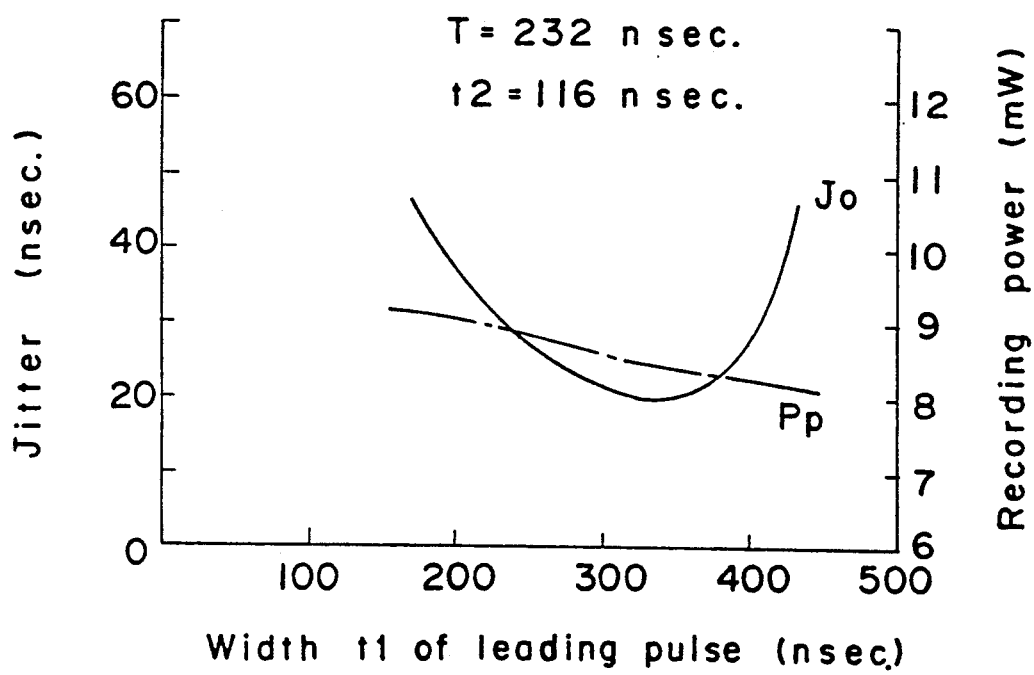
FIGS. 14 to 16 are graphs for defining structure of the pulse train of the optical information recording method of the present invention.

FIG. 14 shows results of the measurement. The jitter J0 measured immediately after recording assumes a minimum value when the width t1 of the leading pulse is about 350 nsec., namely about three times the width t2 of each of the pulses of the subsequent pulse train. Thus, when the width t1 becomes smaller than or larger than this value, jitter is increased. When the width t1 becomes smaller than three times the width t2, temperature does not rise sufficiently at the front end of the recording mark, so that the front end of the recording mark is made thinner such that shape of the recording mark is distorted. On the contrary, when the width t1 exceeds three times the width t2, the front end of the recording mark is increased such that shape of the recording mark is distorted.

It can be understood from FIG. 14 that when the width t1 is not less than twice the width t2 and not more than 3.5 times the width t2, jitter is less than 30 nsec. Especially, when the width t1 is three times the width t2, jitter assumes the minimum value as described above. Meanwhile, recording sensitivity of the optical disk deteriorates as the width t1 is reduced, which does not pose a serious problem.

However, the present inventors have found that an optimum value of the width t1 of the leading pulse changes according to wavelength of the semiconductor laser and numerical aperture of the objective lens in the optical head 8. This might be presumably because diameter of the laser spot is changed by wavelength of the semiconductor laser and numerical aperture of the objective lens.

EXAMPLE 10

In this example, the semiconductor laser and the objective lens in the optical disk 8 are set at a wavelength of 780 nm and a numerical aperture of 0.55, respectively. In the same manner as in the example 9, the width t1 of the leading pulse is changed in the pulse train shown in FIG. 5b by maintaining the width t2 of each of the subsequent pulse train and the clock period T at 116 nsec. and 232 nsec., respectively and signals are recorded on the optical disk such that jitter of the reproduced signals and recording sensitivity of the optical disk are measured. The optical disk A of the example 1 is employed as the optical disk.

Figure 15:
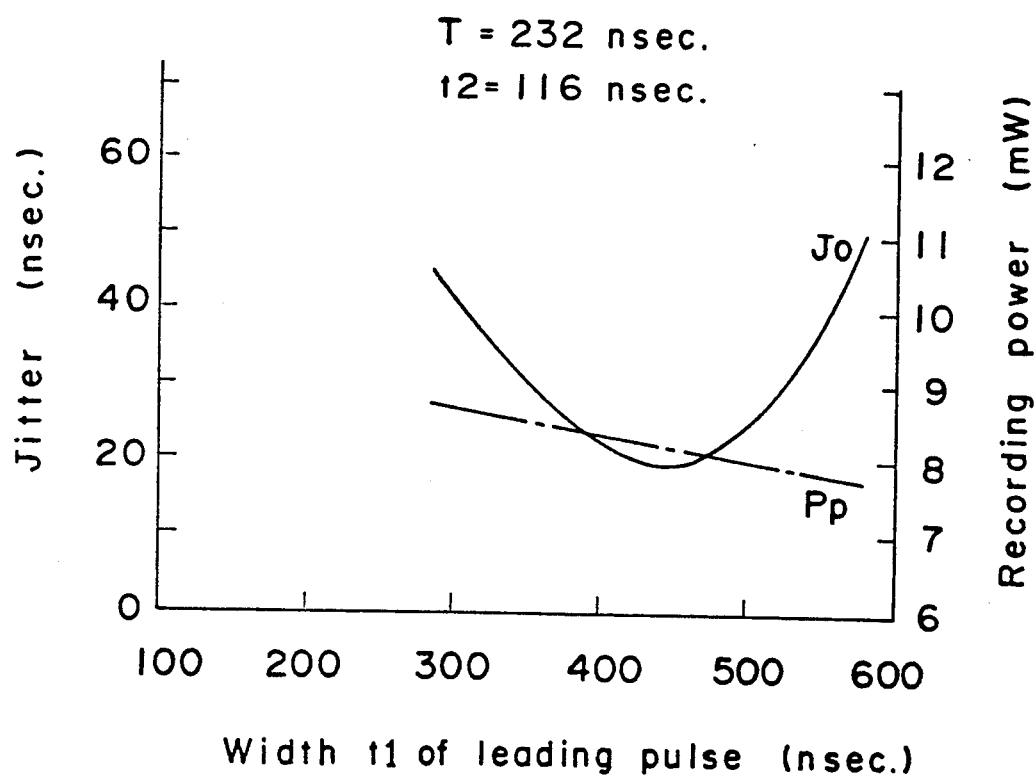

FIG. 15 shows results of the measurement. The jitter J0 measured immediately after recording assumes a minimum value when the width t1 of the leading pulse is about 460 nsec., namely about four times the width t2 of each of the pulses of the subsequent pulse train. Thus, when the width t1 is smaller than or larger than this value, jitter is increased. Namely, the optimum value of the width t1 of the leading pulse is shifted larger than that of the example 9.

It will be seen from FIG. 15 that when the width t1 is not less than three times the width t2 and not more than 4.5 times the width t2, jitter is less than 30 nsec. Especially, when the width t1 is four times the width t2, jitter assumes the minimum value as described above. Meanwhile, recording sensitivity of the optical disk deteriorates as the width t1 is decreased, which does not offer a grave problem.

It is concluded from the examples 9 and 10 that the width t1 of the leading pulse should range from twice the width t2 to 4.5 times the width t2. In the examples 9 and 10, the number of the leading pulse is set at one. This is because the present inventors have found that if the leading pulse is divided into two or more, jitter is increased enormously. The multi-pulse recording method having the single leading pulse is suitable for the optical disk of the heat diffusion construction according to the present invention.

EXAMPLE 11

In this example, the width t2 of each of the pulses of the subsequent pulse train is changed in the pulse train shown in FIG. 5b by maintaining relation of $(t1=3 \times t2)$ and setting the clock period T at 232 nsec. and signals are recorded on the optical disk such that jitter of the reproduced signals and recording sensitivity of the optical disk are measured. The semiconductor laser and the objective lens in the optical head 8 have a wavelength of 830 nm and a numerical aperture of 0.5, respectively, which are identical with those of the example 9. The optical disk A of the example A is employed as the optical disk.

Figure 16:
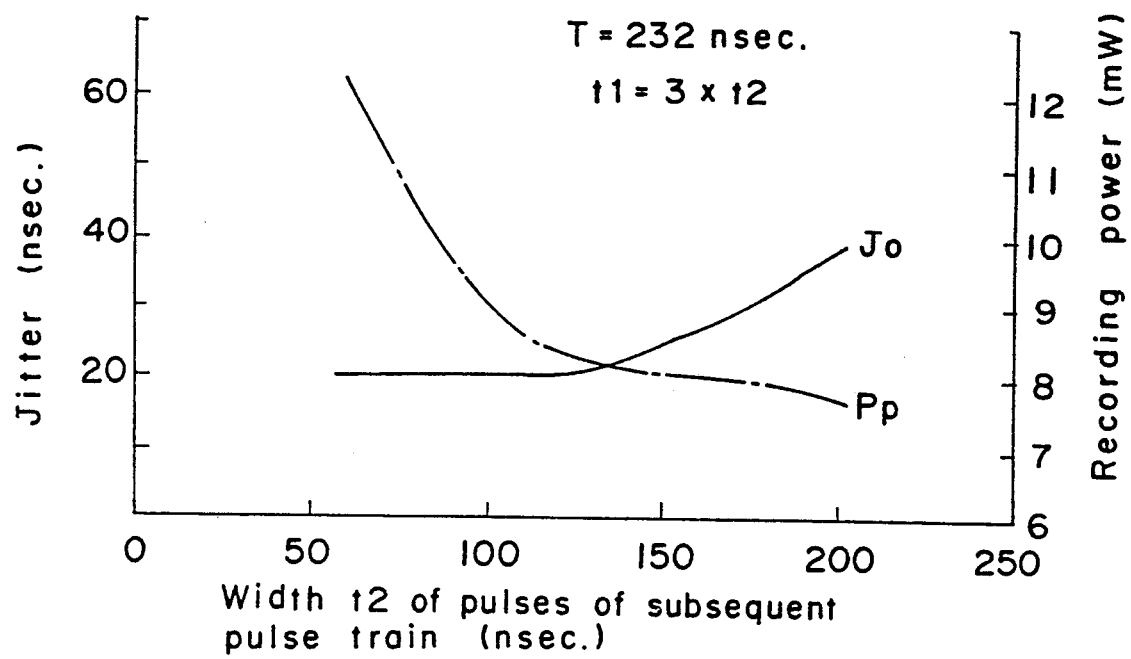
Figure 17:
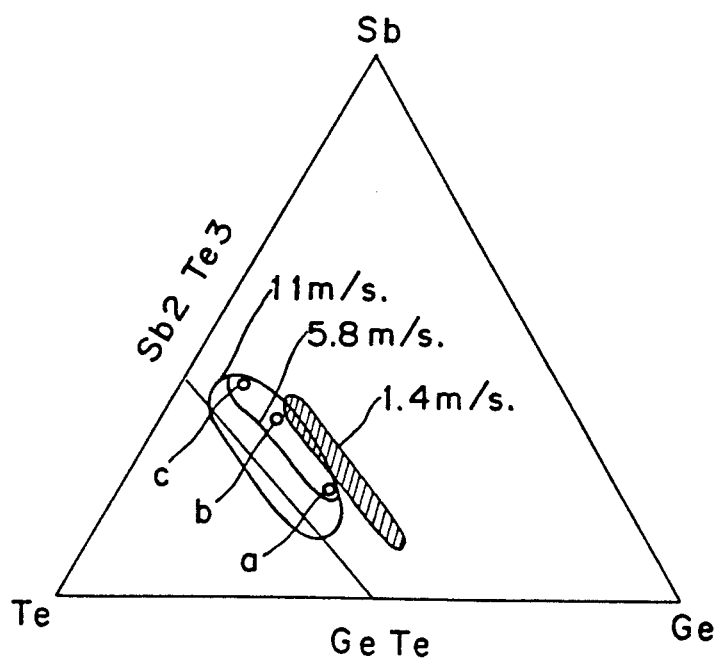
FIG. 17 is a diagram showing composition of a recording film of a prior art optical disk (already referred to)

FIG. 16 shows results of the measurement. The jitter J0 measured immediately after recording is increased as the width t2 of each of the pulses of the subsequent pulse train. This is probably because heat accumulation is caused by decrease of the interval of the pulses of the subsequent pulse train. When the width t2 is not more than 175 nsec., namely not more than three-fourths of the repetition period T of 232 nsec. of the subsequent pulse train, jitter is 30 nsec. or less. Meanwhile, recording sensitivity of the optical disk deteriorates sharply as the width t2 is reduced. This is because energy for heating the recording film to a melting point or more is required to be imparted instantaneously as the width t2 is decreased. When the width t2 is not less than about 85 nsec., namely not less than about three-eighths of the repetition period T of 232 nsec. of the subsequent pulse train, the recording power Pp is 10 mW or less.

Namely, in the optical disk of the heat diffusion construction according to the present invention, the width t2 of each of the pulses of the subsequent pulse train should range from three-eighths to three-fourths of the repetition period T of the subsequent pulse train. Especially, when the width t2 is half of the repetition period T, both jitter and the recording power Pp are small. Meanwhile, an optimum value of the width t2 does not depend substantially on wavelength of the semiconductor laser and numerical aperture of the objective lens in the optical head 8.

In the above experiments 1 to 11, signals are recorded by single beam overwriting. When the signals are recorded by single beam overwriting, such a case may happen that the old signals are left unerased A large unerased portion of the signals increases jitter.

EXAMPLE 12

In this example, before signals are recorded by single beam overwriting, an laser beam is continuously irradiated onto the optical disk preliminarily by maintaining the laser power at not less than a level for fusing the recording film.

After single beam overwriting has been performed 9 times by employing the optical disks A and B and the multipulse recording method of the example 1, the laser beam is irradiated onto the signal tracks by setting the laser power at a level identical with that of the recording power Pp. Subsequently, signals are recorded by a laser beam modulating method identical with that of single beam overwriting and jitter of the reproduced signals are measured Results of the measurement reveal that jitter of the optical disk A is 15 nsec. and jitter of the optical disk B is 37 nsec. Therefore, jitters of the optical disks A and B are improved as compared with those of Table 1 referred to earlier. Accordingly, it is clearly effective for reduction of jitter that prior to recording of signals, a laser beam is continuously irradiated onto the optical disk preliminarily by maintaining the laser power at not less than a level for fusing the recording film.

As will be seen from the foregoing description, the optical disk of the present invention not only reduces heat accumulation greatly but achieves high erasure speed, excellent recording sensitivity and remarkable thermal stability.

Meanwhile, the optical information recording method of the present invention is also capable of reducing heat accumulation at the rear end portion of the recording mark.

Furthermore, if prior to passage of the recording beam, the laser beam is continuously irradiated onto the optical disk preliminarily by maintaining the laser power at not less than the level for fusing the recording film, the old signals are irradiated substantially completely and jitter can be reduced. The optical disk and the optical information recording method, according to the present invention produce a good effect on reduction of distortion of shape of the recording mark even if employed independently. However, when both the optical disk and the optical information recording method, according to the present invention are employed simultaneously, the effect is enhanced further and thus, it becomes possible to obtain the reproduced signals having quality equivalent to that of the compact disk even at a low linear speed of, for example, 1.2–1.4 m/sec.

Although the present invention has been fully described by way of example with reference to the accompanying drawings, it is to be noted here that various changes and modifications will be apparent to those skilled in the art. Therefore, unless otherwise such changes and modification depart from the scope of the present invention, they should be construed as being included therein.

What is claimed is:

1. An optical disk in which a first dielectric film, a recording film, a second dielectric film and a reflecting film are stacked on a substrate in this order;

said recording film having composition defined by a formula $Ge_xSb_yTe_z$ wherein x, y and z are atomic percentages ranging from 7 to 17, 34 to 44 and 44 to 54, respectively, said x, y and z totalling 100;

said recording film having a thickness of 10 t 35 nm;

said second dielectric film having a thickness of 5 to 40 nm;

said reflecting film being made of one or an alloy of at least Au, Al, Ti, Cr and Ni and having a thickness of 35 nm or more.

2. An optical disk as claimed in claim 1, wherein the composition of said recording film falls on a line connecting $GeSb_2Te_4$ and Sb in a composition diagram of equilateral triangle having Ge, Sb and Te set at its vertexes, respectively.

3. An optical disk as claimed in claim 2, wherein the composition of said recording film is represented by $Ge_{12}Sb_{39}Te_{49}$.

4. An optical disk as claimed in claim 1, wherein said recording film has a thickness of 15 to 25 nm.

5. An optical disk as claimed in a claim 1, wherein said first and second dielectric films are made of at least one of $SiO_2$, ZnS, $Si_3N_4$, AlN, TiN and ZnSe, a mixture of ZnS and $SiO_2$ or a mixture of ZnSe and $SiO_2$.

6. An optical disk as claimed in claim 1, wherein said second dielectric film has a thickness of 10 to 25 nm.

7. An optical disk as claimed in claim 1, wherein said reflecting film has a thickness of 45 nm or more.

* * * * *